US00RE39380E

(19) United States
(12) Reissued Patent
Davis

(10) Patent Number: US RE39,380 E
(45) Date of Reissued Patent: Nov. 7, 2006

(54) ELECTRICAL CONNECTOR WITH PROTECTION FOR ELECTRICAL CONTACTS

(75) Inventor: Wayne Samuel Davis, Harrisburg, PA (US)

(73) Assignee: The Whitaker Corporation, Wilmington, DE (US)

(21) Appl. No.: 09/628,669

(22) Filed: Jul. 28, 2000

Related U.S. Patent Documents

Reissue of:
(64) Patent No.: 5,785,557
Issued: Jul. 28, 1998
Appl. No.: 08/014,911
Filed: Feb. 8, 1993

U.S. Applications:
(63) Continuation-in-part of application No. 08/005,690, filed on Jan. 19, 1993, now Pat. No. 5,295,843.

(51) Int. Cl.
*H01R 24/00* (2006.01)

(52) U.S. Cl. ..... 439/660; 439/607; 439/108
(58) Field of Classification Search ..... 439/290, 439/660, 607, 609, 610, 637, 924, 62, 79, 439/108
See application file for complete search history.

(56) References Cited

U.S. PATENT DOCUMENTS

| | | | | | |
|---|---|---|---|---|---|
| 3,663,930 | A | * | 5/1972 | Henschen | |
| 3,760,335 | A | | 9/1973 | Roberts | |
| 3,868,162 | A | * | 2/1975 | Ammon | |
| 4,084,875 | A | | 4/1978 | Yamamoto | 439/490 |
| 4,464,832 | A | | 8/1984 | Asick et al. | 439/55 |
| 4,582,386 | A | * | 4/1986 | Martens | |
| 4,653,825 | A | | 3/1987 | Olsson | |
| 4,687,267 | A | | 8/1987 | Header et al. | 439/62 |
| 4,824,383 | A | | 4/1989 | Lemke | 439/108 |
| 5,017,156 | A | | 5/1991 | Sugiyama | 439/607 |
| 5,057,028 | A | | 10/1991 | Lemke et al. | 439/101 |
| 5,066,240 | A | | 11/1991 | Verdun | 439/607 |
| 5,073,130 | A | | 12/1991 | Nakamura | 439/607 |
| 5,085,601 | A | | 2/1992 | Buchter et al. | 439/660 |
| 5,135,414 | A | | 8/1992 | Van Dijk | 439/660 |
| 5,158,481 | A | | 10/1992 | Frantz | 439/607 |
| 5,190,480 | A | * | 3/1993 | Chau et al. | 439/637 |
| 5,222,909 | A | | 6/1993 | Nomura et al. | 439/607 |

* cited by examiner

*Primary Examiner*—Khiem Nguyen

(57) ABSTRACT

An electrical connector (1) comprising, an insulative housing (2), conductive contacts (4, 5) within an interior of the housing (2), insulative wiping surfaces (61) on a mating end (12) of the housing (2), and conductive surface areas (60) on the contacts (4, 5) being rearward of the wiping surfaces (61) and offset laterally of the wiping surfaces (61) to engage unwiped surface areas of mating contacts (4, 5) of another, mating connector (1).

35 Claims, 8 Drawing Sheets

ELECTRICAL CONNECTOR WITH PROTECTION FOR ELECTRICAL CONTACTS

Matter enclosed in heavy brackets [ ] appears in the original patent but forms no part of this reissue specification; matter printed in italics indicates the additions made by reissue.

RELATED APPLICATION INFORMATION

This is a Continuation-in-Part of U.S. patent application Ser. No. 08/005,690 filed Jan. 19, 1993, now U.S. Pat. No. 5,295,843.

FIELD OF THE INVENTION

The present invention relates to an electrical connector having electrical contacts, wherein the contacts are prevented from being wiped with insulation during mating connection with another, mating connector.

BACKGROUND OF THE INVENTION

An electrical connector, known from U.S. Pat. No. 3,760,335, comprises, an insulating housing and conductive signal contacts. The contacts are grouped in pairs, with an insulative divider of the housing separating one contact of the pair from the other contact of the pair. Multiple pairs of the contacts are distributed along the insulative divider. The pairs of contacts are especially suitable for connection to twisted pair wires used in the communications industry for data and voice transmission. Each pair of the twisted pair wires are connected to one pair of the contacts. To shield the connector from ESD, electrostatic discharge, a conductive metal shell surrounds the insulative housing of the connector. For example, a shielded connector is disclosed in U.S. Pat. No. 5,158,481.

A desirable shielded connector provides ESD protection for the electrical contacts of the connector during mating connection of the connector with another, mating connector. During mating connection of two mating connectors, an electrostatic voltage charge on one or both of the connectors should be discharged to ground electrical potential via the shield on one or both of the connectors, whereby the voltage charge is shunted away from electrical contacts in the connectors.

SUMMARY OF THE INVENTION

A feature of the invention resides in a shield covered connector with tips of electrical contacts being recessed from a mating end of the connector, and being covered by insulative material that provides ESD protection for the contacts.

Another feature of the invention resides in a connector with insulative wiping surfaces that provide ESD protection for electrical contacts, the wiping surfaces being offset from contact surfaces of the contacts, in the direction of mating insertion, to avoid insulative material being wiped onto the contact surfaces during mating connection with another, mating connector.

DESCRIPTION OF THE DRAWINGS

An embodiment of the invention will now be described by way of example with reference to the drawings according to which;

With reference to FIGS. 1 through 6, each of two mating embodiments of an electrical connector 1 comprises, an insulative housing 2, multiple pairs 3 of conductive signal contacts 4, 5, accompanied by at least one power contact 6, in the housing 2. The pairs 3 of the signal contacts 4, 5 are distributed along an insulative divider 7 in an interior 8 of the housing 2. The signal contacts 4, 5 of each pair 3 are on opposite sides of the divider 7 that separates the signal contacts 4, 5 of each pair 3. The signal contacts 4, 5 are in rows, and are parallel to one another. A pair of contact fingers 9 on the power contact 6 are on opposite sides of the divider 7, and extend parallel to the signal contacts 4, 5. The surface area of each of the fingers 9 is larger than that of each of the signal contacts 4, 5, and is sufficiently broad to radiate heat from electrical power dissipation. In addition, each of the fingers 9 is of greater mass than each of the signal contacts 4, 5 to carry electrical current. When electrical current is transmitted by the power contact 6, dissipation of electrical power generates heat. The heat is radiated from the surface area of the power contact 6. A larger surface area and a higher mass of the power contact 6 will limit the temperature attained by the power contact 6.

Figure 1:
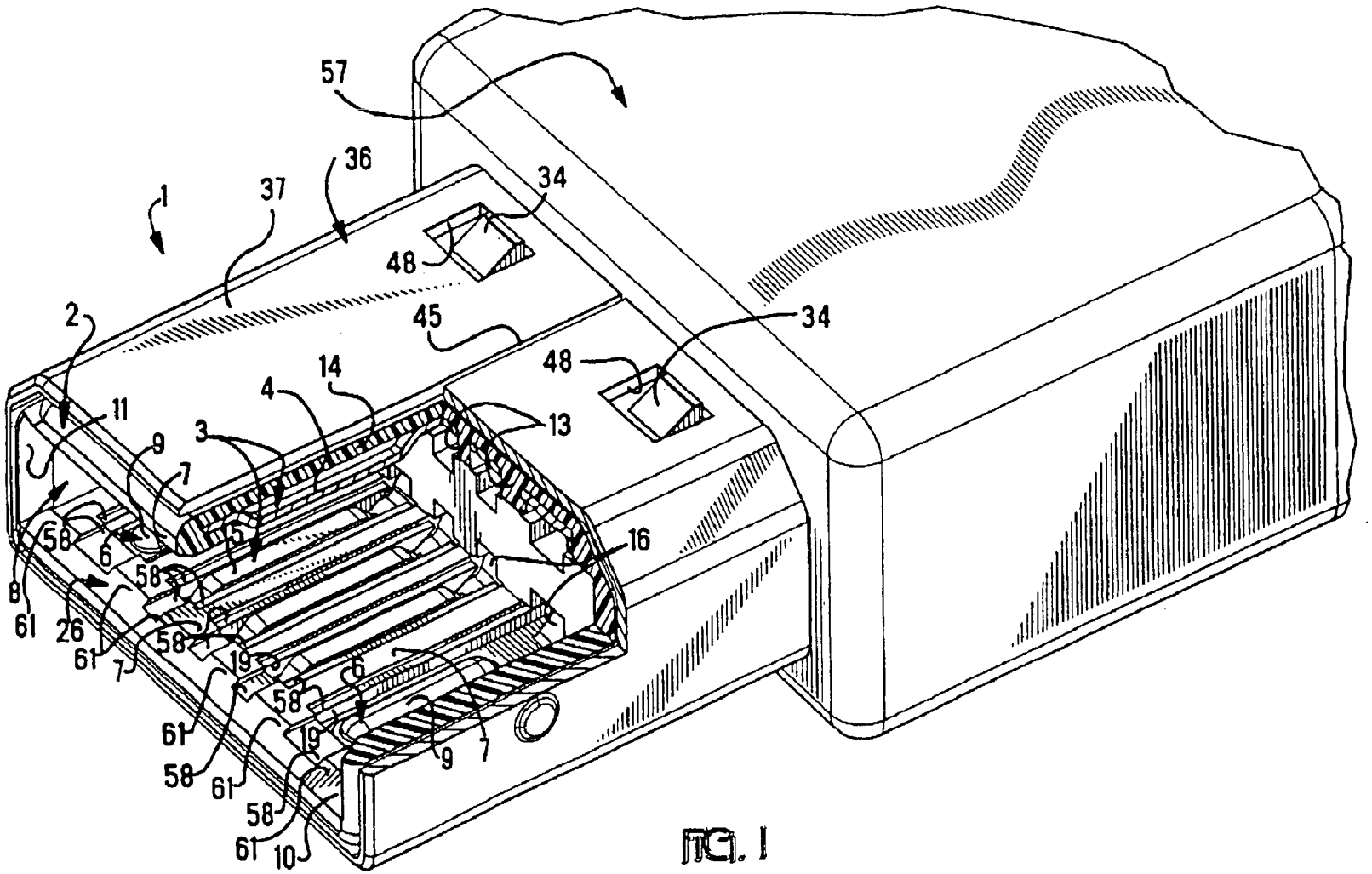
FIG. 1 is a fragmentary perspective view of an electrical connector.

The divider 7 bridges between, and is joined to side walls 10, 11 of the housing 2. The divider 7 extends from a front mating end 12 of the housing 2 and rearwardly in the interior 8 of the housing 2. Spaced apart partitions 13 in the interior 8 bridge between the divider 7 and a top wall 14 of the housing 2, and between the divider 7 and a bottom wall 15 of the housing 2. The partitions 13 join the divider 7 and the top and bottom walls 14, 15. The walls 14, 15 bridge between and join the side walls 10, 11 to form the exterior of the housing 2. Contact receiving cavities 16 in the housing 2 are defined between the partitions 13 and extend behind the divider 7 to receive the signal contacts 4, 5. With respect to the power contact 6, FIGS. 5 and 9, the fingers 9 are connected to a body portion 17 having a surface area sufficiently broad to radiate heat from electrical power dissipation. A pocket 18 in the housing 2, between a side wall 14, 15 and a partition 13, and behind the divider 7, receives the body portion 17. Each of the contact receiving cavities 16 is smaller than the pocket 18. The power contact 6 can be inserted in the housing 2 unmistakenly in the pocket 18 that is larger than each of the smaller, contact receiving cavities 16 that is smaller than the body portion 17. The divider 7 extends forwardly of the partitions 13, and is provided with a series of grooves 19 on its opposite sides aligned with the contact receiving passages. The grooves 19 receive the signal contacts 4, 5 and the contact fingers 9. The grooves 19 that receive the contact fingers 9 are larger than the grooves 19 that receive the signal contacts 4, 5. Projecting lances 20 on each signal contact 4, 5, FIGS. 7 and 8, and on the power contact 6 impinge against walls 21 of the housing 2, and resist withdrawal of the contacts 4, 5 and 6 from the grooves 19. Each of the signal contacts 4, 5 and the power contact 6 is of unitary construction, stamped and formed from a strip of metal.

With respect to FIGS. 3–7, a circuit board connector 1, meaning a version of the connector 1 for mounting on a circuit board, not shown, will be described. The divider 7 is spaced apart from the top and bottom walls 14, 15 of the housing 2. The grooves 19 face toward the top and bottom walls 14, 15. The pairs 3 of signal contacts 4, 5 are adapted to be connected to a circuit board, not shown. An electrical termination 22 in the form of a post extends laterally downward from each of the signal contacts 4, 5 for connection to a circuit board, not shown, and more particularly, to a plated aperture, not shown of the circuit board. The terminations 22 extend laterally downward by bending the signal contacts 4, 5 along their lengths, the signal contact 4 being longer in length than the signal contact 5.

Figure 5:
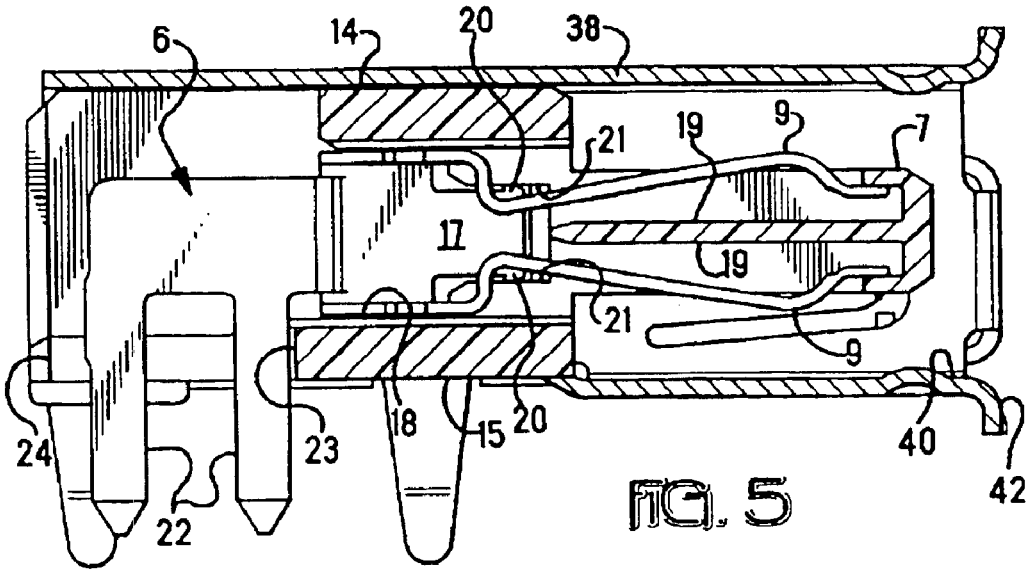
FIG. 5 is an elevation view in section of the connector shown in FIG. 4.
Figure 6:
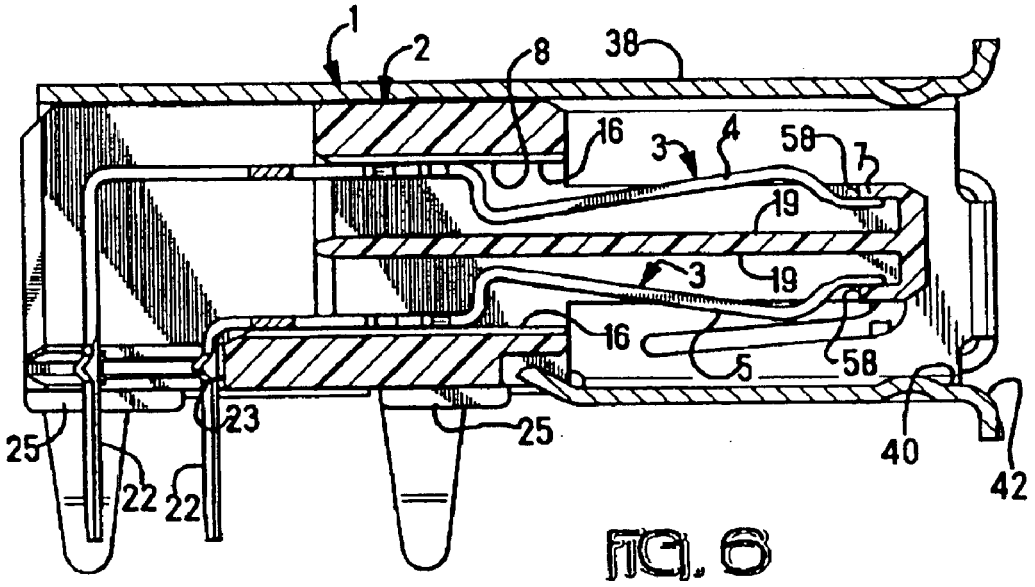
FIG. 6 is a view similar to FIG. 5, illustrating signal contacts in the connector shown in FIG. 3.
Figure 9:
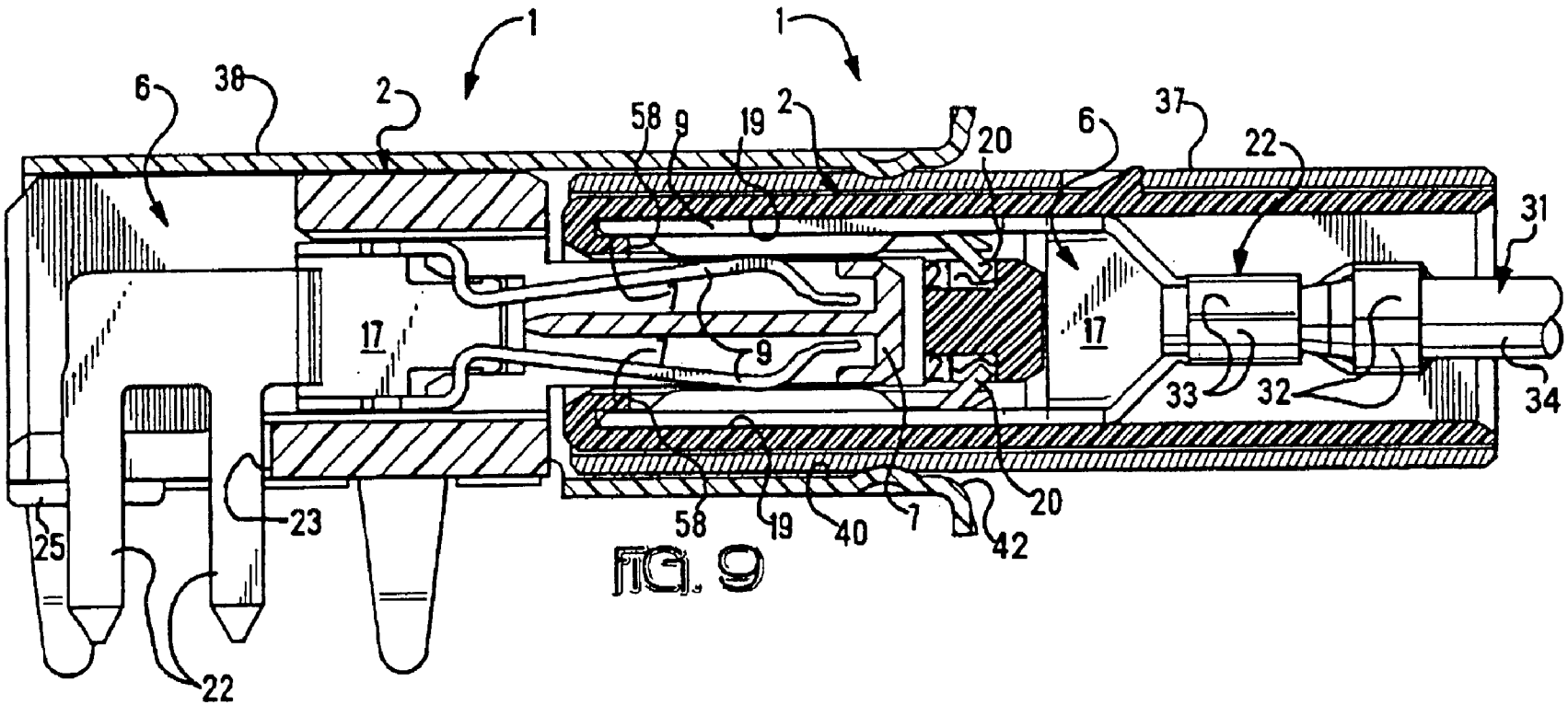
FIG. 9 is a section view similar to FIG. 8, illustrating mating engagement of power contacts of the connectors.

With reference to FIGS. 5 and 9, the body portion 17 has a thickness that is the same thickness as each of the contact fingers 9. The fingers 9 are bent to extend outward from the body portion 17 such that the thickness of the body portion 17 is in a plane perpendicular to a plane of thickness of each of the contact fingers 9. A termination 22 in the form of a pair of posts extend laterally downward of each body portion 17 for connection to a circuit board, not shown, and more particularly, for connection in plated apertures, not shown, of the circuit board. Each of the terminations 22 is larger in surface area and mass than that of each of the terminations 22 on the signal contacts 4, 5, thereby to conduct electrical current, and to radiate heat resulting from dissipation of electrical power.

The terminations 22 are on the signal contacts 4, 5 where they emerge from a rear of the divider 7. The terminations 22 are on the power contact 6 where it emerges from a rear of the divider 7. A series of slots 23 in the bottom wall 15 of the housing 2 have open ends communicating with a rear end 24 of the bottom wall 15. The terminations 22 project through the slots 23, with the terminations 22 of each pair 3 of the contacts 4, 5 being spaced apart along the same slot 23. The bottom wall 15 of the housing 2 provides a base from which knob shaped feet 25, FIGS. 6–8, extend for resting against a circuit board, not shown.

Figure 3:
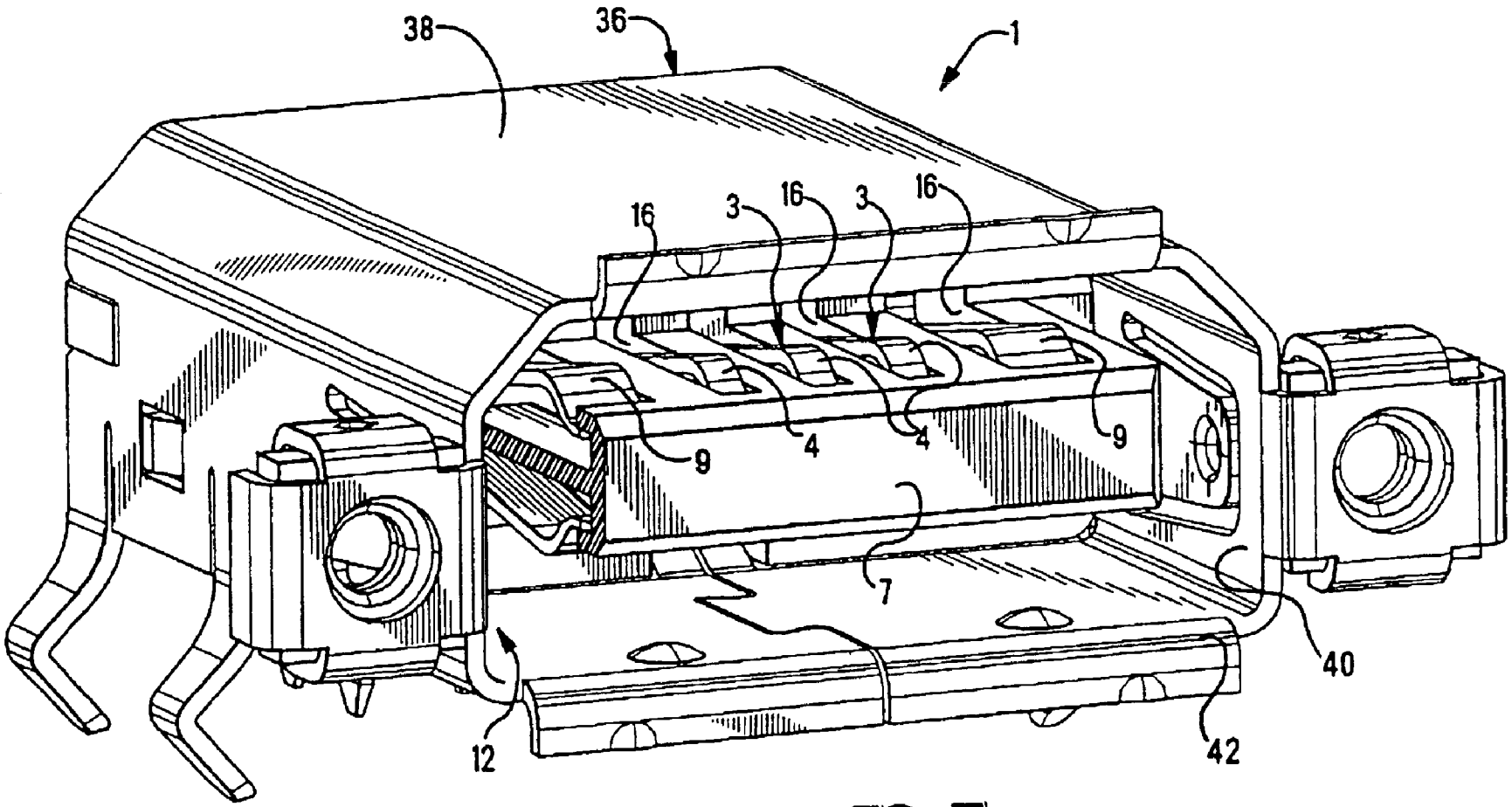
FIG. 3 is a fragmentary perspective view of another, mating electrical connector for mating connection with the connector shown in FIG. 1.
Figure 4:
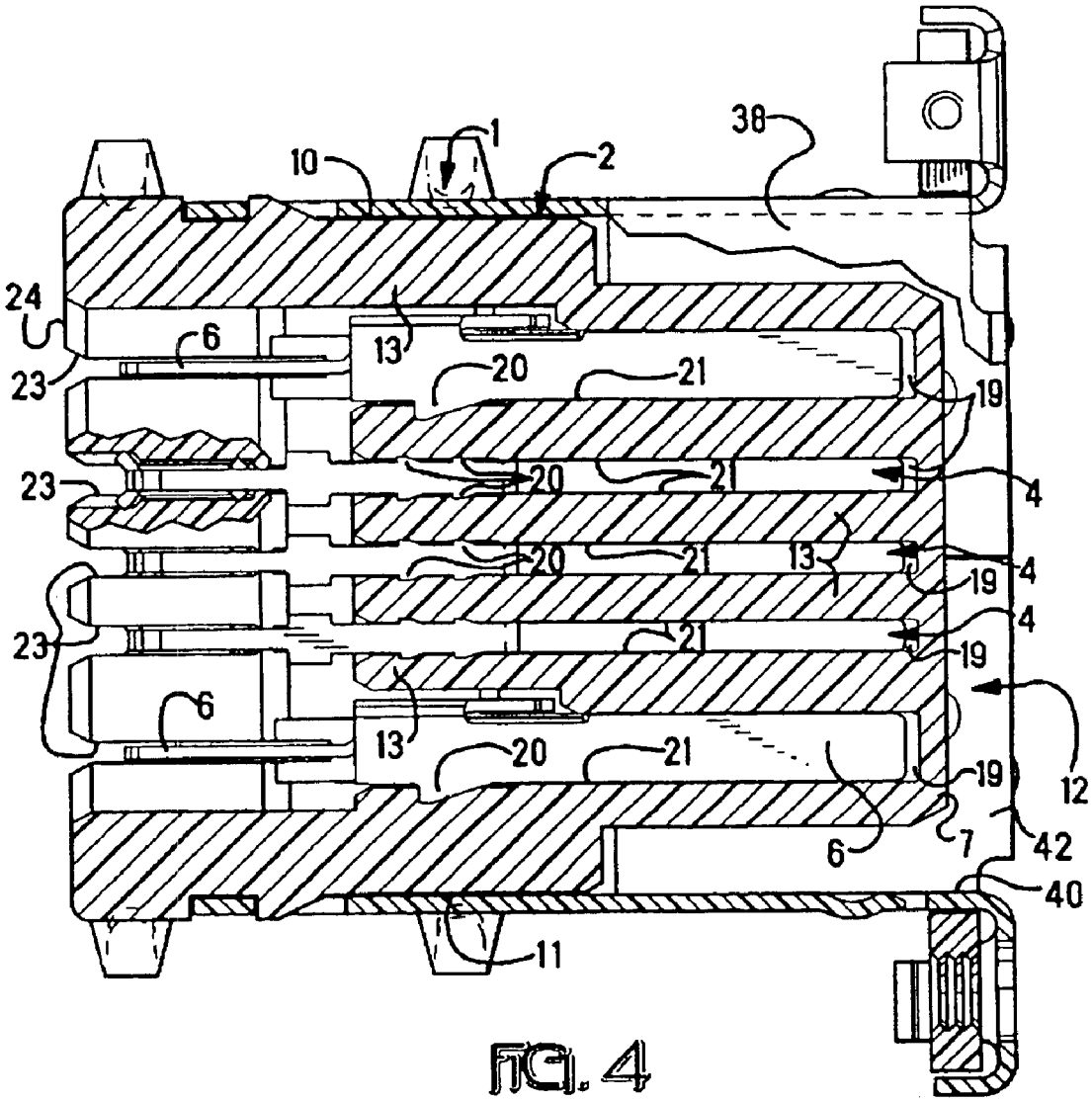
FIG. 4 is a section view of the connector shown in FIG. 3.
Figure 7:
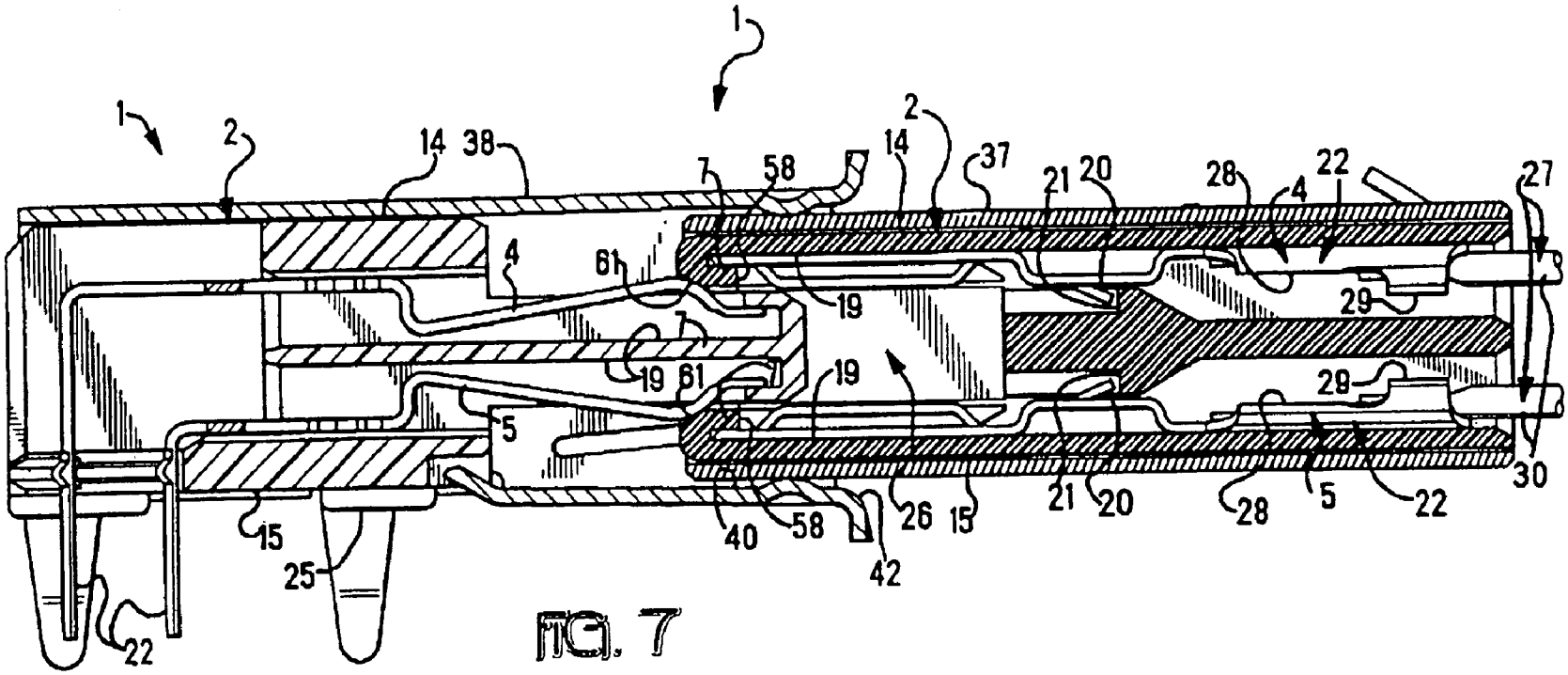
FIG. 7 is an elevation view in section of the connectors shown in FIGS. 1 and 3 prior to mating engagement with each other.

With reference to FIGS. 1, 2 and 7–9, a cable connector 1, meaning a connector 1 for connection to an electrical cable, not shown, will be described. The cable connector 1 is adapted for mated connection with the version of the connector 1. FIGS. 3 and 4, for mounting on a circuit board, not shown. The divider 7 of the cable connector 1 is bifurcated by a passage 26 at the front mating end 12 for receiving the divider 7 of the version of the connector 1 for mounting on a circuit board, not shown. The grooves 19 face toward the passage 26, such that the contacts 4, 5 on opposite sides of the divider 7 face toward the passage 26. The pairs 3 of signal contacts 4, 5 are adapted to be connected to respective pairs 3 of signal wires 27 of a single electrical cable, not shown, or of multiple electrical cables, not shown. The signal wires 27 can be a twisted pair of signal wires 27. In FIG. 7, each of the signal contacts 4, 5 further comprises a termination 22 having arms 28 that extend outward laterally of each other, the arms being bendable into an open barrel configuration to encircle and connect with the signal wire 27. Another set of arms 29 extend laterally of each other, the arms 29 being bendable into an open barrel configuration to encircle and connect with insulation 30, FIG. 8, encircling the signal wire 27.

With reference to FIG. 9, the contact fingers 9 extend from a connection to an electrical power transmitting wire 31 larger in diameter than each of the signal wires 27. The wire 31 may comprise an electrical power cable. In particular, the body portion 17 comprises a termination 22 having sets of arms 32, 33 that extend outward laterally of each other, the arms 32 being bendable into an open barrel configuration to encircle and connect with the electrical power transmitting wire 31. The wire 31 is larger in diameter than each of the signal wires 27 to carry electrical current. The signal wires 27 are smaller in diameter, as they are required to transmit electrical signals of which the voltage, not the electrical power, is of paramount importance. The set of arms 33 extend laterally of each other, and are bendable into an open barrel configuration to encircle and connect with insulation encircling the wire 31.

With reference to FIG. 1, projecting locks 34 are on the exterior of the wall 14. The locks 34 are in the form of inclined wedge projections tapering toward the front mating end 12. The mating end 12 has a profile including chamfers 35, FIG. 2, that intersect the wall 14, making the wall 14 less wide than the wider wall 15, thereby providing the connector 1 with polarity for orienting the mating end 12.

Figure 2:
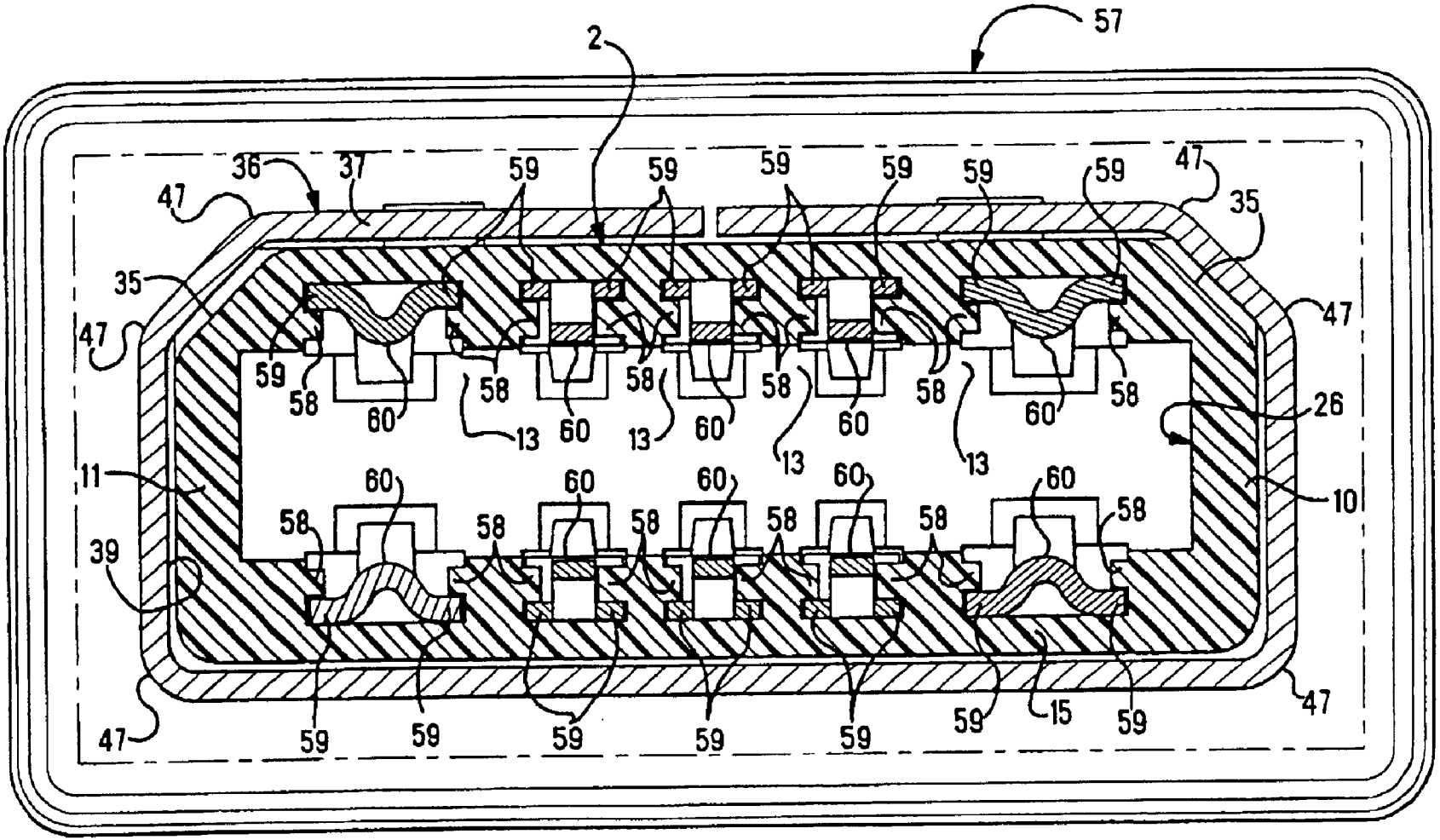
FIG. 2 is a section view of the connector shown in FIG. 1.

With reference to FIGS. 1 and 2, shielding 36 for both electrical connectors 1, comprises; two conductive, telescopic shells 37, 38 that fit and slide one within the other. Each of the shells 37, 38 is of unitary construction, stamped and formed from a metal plate. The shells 37, 38 each are bent on themselves, forming wrapped sections, and forming telescopic first and second tubular enclosures 39, 40, with open front ends 41, 42 defining mating ends of the shells 37, 38.

A number of folds 47 in the tubular enclosure 39 conform to an exterior shape of the housing 2 of the connector 1. The folds 47 define the circumference of the profile on the mating end 41. Folds 47 in the enclosure 40 define the circumferences of the open ends 42, 44. The folds 47 conform the shell 38 with the shape of the first shell 37. A seam 45 extends along the tubular enclosure 39. Multiple locks 48, in the form of openings, located on both sides of the seam 45, lock to the connector 1 by locking to the projecting locks 34 on the housing 2. An overmold 57, FIG. 8, in the form of a molded insulation of desired shape, covers and adheres to the cable 25 and the strain relief portions 51, 52.

With reference to FIGS. 2 and 5–9 both connectors 1 will be described further. Flanges 58 on the divider 7 of the housing 2 overhang the front ends of the grooves 19 and overhang both lateral sides of each of the grooves 19. The flanges 58 overlap front tips on the contacts 4, 5 and front tips of the contact fingers 9 that are in respective grooves 19. The front tips of the contacts 4, 5 and of the contact fingers 9 are recessed from the mating end 12 of the housing 2.

With reference to the circuit board connector 1 shown in FIGS. 3 and 4, each of the contacts 4, 5, and the contact fingers 9, are inclined and bowed along their lengths to project outwardly bowed from the grooves 19. The bowed contacts 4, 5, and the bowed contact fingers 9, are resiliently deflectable by flattening their bowed configurations. For example, during mating connection of the connectors 1, one to the other, FIG. 8, the contacts 4, 5 and the contact fingers 9, of one connector 1, are matingly inserted into the other, mating connector 1. The bowed contacts 4, 5, and the bowed contact fingers 9, of the circuit board connector 1 engage respective contacts 4, 5, and contact fingers 9, of the cable connector 1, and are flattened somewhat to exert pressure engagement with the contacts 4, 5, and the contact finger 9, of the cable connector 1.

The cable connector 1 provides ESD protection, electrostatic discharge protection, for the signal contacts 4, 5. ESD protection is provided for the power contacts 6, as well. With reference to the cable connector 1 shown in FIGS. 1 and 2, the flanges 58, that overhang sides of the grooves 19, overlap lateral edge margins 59, FIG. 2, on each of the contacts 4, 5 on each of the contact fingers 9. The lateral edge margins 59 are received in respective grooves 19. On each signal contact 4, 5, and on each contact finger 9, a raised, conductive, contact surface 60 is allocated to a central section on each contact 4, 5 and on each contact finger 9 between the lateral edge margins 59. The conductive surface area 60 is raised with respect to the lateral edge margins 59. With respect to the contacts 4, 5, the conductive surface area 60 is separated from the lateral edge margins 59 by slits. With respect to the power contacts 9, the conductive surface area 60 is raised by bending the power contacts 9 lengthwise along the edge margins 59.

Within the passage 26 and on the mating end 12 of the housing 2, are multiple, insulative wiping surfaces 61 in the form of inclined ramps. The wiping surfaces 61 are spaced apart one from another, and appear as a castellated structure. The wiping surfaces 61 are interposed between the tips of the contacts 4, 5 and the mating end 12 of the housing 2. The wiping surfaces 61 are over the front tips of the contacts 4, 5 and of the contact fingers 9. The wiping surfaces 61 are in axial alignment with the edge margins 59 on the contacts 4, 5, and on the contact fingers 9, and are offset laterally from the contact surfaces 60 on the contacts 4, 5 and on the contact fingers 9. The wiping surfaces 61 project along paths of mating insertion of the contacts 4, 5, and the contact fingers 9, and are interposed between the mating end 12 of the housing 2 and the exposed contacts 4, 5 and the exposed contact fingers 9.

With reference to FIG. 7, with the conductive shells 37, 38 engaged, the contacts 4, 5 and the contact fingers 9, of the circuit board connector 1, will engage the insulative wiping surfaces 61, prior to engagement with the respective contacts 4, 5 and contact fingers 9, of the cable connector 1. At least the shell 38 of the circuit board connector 1 will be referenced to ground electrical potential, by virtue of being connected to a ground plane of a circuit board, not shown. The engaged conductive shells 37, 38 discharge electrostatic voltages to ground before the contacts 4, 5 and the contact fingers 9 of the connectors 1 engage one another. The engaged conductive shells 37, 38 are engaged while the insulative wiping surfaces 61 are interposed between the contacts 4, 5 of the two connectors 1, and between the contact fingers 9 of the two connectors 1. To mate the connectors 1, the contacts 4, 5 and the contact fingers 9, of the circuit board connector 1 will wipe against, and ride over, the insulative wiping surfaces 61 as mating connection of the connectors 1 takes place.

Figure 8:
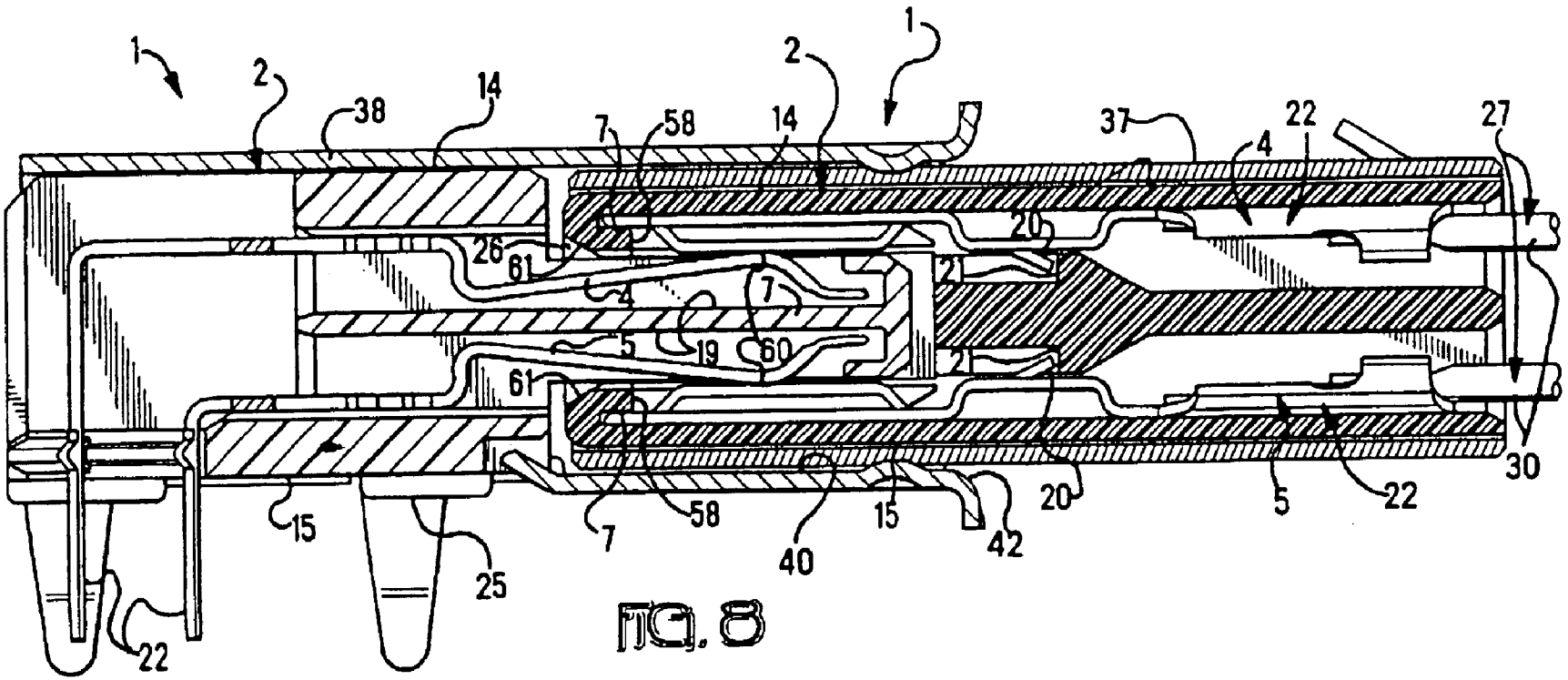
FIG. 8 is a view similar to FIG. 7, illustrating the connectors in mating engagement with each other.

During mating engagement of one connector 1 and the other connector 1, the contacts 4, 5 of the circuit board connector 1 will wipe, or stroke against, the contacts 4, 5 of the cable connector 1, as shown in FIG. 8. It is desired to avoid wiping of the contacts 4, 5 and the contact fingers 9 against the insulative material 61 of the housings 2, particularly at the same places where the contacts 4, 5 engage one another, and where the contact fingers 9 engage one another. Such wiping against the insulative material 61 would tend to apply insulative material on the contacts 4, 5 and on the contact fingers 9. The presence of insulative material on the contacts 4, 5 and on the contact fingers 9, where they engage one another during mating connection, would reduce electrical conductivity, undesireably. The contact surfaces 60 on respective contacts 4, 5 are rearward of the insulative wiping surfaces 61 in the passage 26. The contacts 4, 5 of the circuit board connector 1 wipe against the insulative wiping surfaces 61 prior to engagement with the contacts 4, 5 of the cable connector 1. However, the insulative wiping surfaces 61 are offset laterally from the contact surfaces 60 of the contacts 4, 5 in the cable connector 1. The mating contacts 4, 5 of the circuit board connector 1 are axially aligned in the direction of mating insertion with the contacts 4, 5 of the cable connector 1. The wiping surfaces 61 are aligned with the side margins 59 of the contacts 4, 5 and the contact fingers 9, of the circuit board connector 1, in the direction of mating insertion. The middle surface areas, between the lateral side margins 59, of the contacts 4, 5 and the contact fingers 9, of the circuit board connector 1, are offset laterally of the wiping surfaces 61, during mating insertion into the cable connector 1. These middle surface areas pass between the insulative wiping surfaces 61, and are unwiped by the insulative wiping surfaces 61 during passage of the side margins of the contacts 4, 5 and the contact fingers 9 over the wiping surfaces 61. The contact surfaces of the contacts 4, 5 and the contact fingers 9, of the cable connector 1, engage these unwiped, middle surface areas of the mating contacts 4, 5 and contact fingers 9, of the circuit board connector 1. Thereby, the presence of insulative material is avoided on the contacts 4, 5 and on the contact fingers 9, at the locations where they engage one another during mating connection of the connectors 1.

An advantage of the invention resides in a connector 1 with tips of contacts 4, 5 being recessed from a mating end 12 of the connector 1 and covered by insulative material that provides ESD protection for the contacts 4, 5.

Another advantage of the invention resides in a connector 1 with insulative wiping surfaces 61 that provide ESD protection for electrical contacts 4, 5, the wiping surfaces 61 being offset from the contacts 4, 5 in the direction of mating insertion to avoid insulative material being wiped onto contact surfaces of the contacts 4, 5 during mating connection with another, mating connector 1.

Other advantages, and other embodiments and modifications of the invention are intended to be covered by the spirit and scope of the accompanying claims.

I claim:

1. An electrical connector comprising: an insulative housing, conductive contacts within an interior of the housing, wiping surfaces on a mating end of the housing, conductive surfaces on the contacts being rearward of the wiping surfaces and offset laterally of the wiping surfaces to engage unwiped surface areas of mating contacts of another, mating connector, which mating contacts wipe against the wiping surfaces prior to engagement of the unwiped surface areas of the mating contacts with the conductive surface areas of the contacts, the wiping surfaces projecting along paths of mating insertion of the contacts, and being interposed between the contacts and a front edge of the housing.

2. An electrical connector as recited in claim 1, wherein, an insulative divider separates one of the contacts from another of the contacts of each pair of the contacts.

3. An electrical connector as recited in claim 1, further comprising: an insulative divider separating one of the contacts from another of the contacts of each pair of the contacts, at least one conductive power contact having a pair of contact fingers on opposite sides of the divider, the contact fingers having a surface area sufficiently broad to radiate heat from electrical power dissipation, and the fingers extending parallel to the contacts.

4. An electrical connector as recited in claim 1, wherein, the wiping surfaces are interposed between the contacts and a front edge of the housing, and conductive shielding encircles the housing, a front edge of the shielding being closer to the front edge of the housing than the contacts.

5. An electrical connector as recited in claim 1, wherein, front tips of the contacts are recessed from a front edge of the housing, and the wiping surfaces are interposed between the tips of the contacts and the front edge of the housing.

6. An electrical connector as recited in claim 1, wherein, the wiping surfaces cover front tips of the contacts.

7. An electrical connector as recited in claim 1, wherein, the wiping surfaces are ramps.

8. An electrical connector comprising: an insulative housing, conductive contacts within an interior of the housing, wiping surfaces on a mating end of the housing, conductive surfaces on the contacts being rearward of the wiping surfaces and offset laterally of the wiping surfaces to engage unwiped surface areas of mating contacts of another, mating connector, which mating contacts wipe against the wiping surfaces prior to engagement of the unwiped surface areas of the mating contacts with the conductive surface areas of the contacts, and the conductive surfaces being raised with respect to edge margins of the contacts received in grooves in the housing.

9. An electrical connector comprising:

an insulative housing, conductive contacts within an interior of the housing, wiping surfaces on a mating end of the housing and interposed between the contacts and a front edge of the housing, with the wiping surfaces projecting along paths of mating insertion of mating contacts of another, mating connector, conductive surfaces on the contacts being offset laterally of the wiping surfaces and being rearward of the wiping surfaces to engage said mating contacts of said another, mating connector, which mating contacts pass the wiping surfaces prior to engagement with the conductive surfaces, and a conductive shield surrounding the mating end of the housing, the wiping surfaces being closer to the shield than the contacts.

10. An electrical connector as recited in claim 9, wherein, an insulative divider separates one of the contacts from another of the contacts of each pair of the contacts.

11. An electrical connector as recited in claim 9, further comprising: an insulative divider separating one of the contacts from another of the contacts of each pair of the contacts, at least one conductive power contact having a pair of contact fingers on opposite sides of the divider, the contact fingers having a surface area sufficiently broad to radiate heat from electrical power dissipation, and the fingers extending parallel to the contacts.

12. An electrical connector as recited in claim 9, wherein, the wiping surfaces are interposed between the contacts and a front edge of the housing, and conductive shielding encircles the housing, a front edge of the shielding being closer to the front edge of the housing than the contacts.

13. An electrical connector as recited in claim 9, wherein, front tips of the contacts are recessed from a front edge of the housing, and the wiping surfaces are interposed between the tips of the contacts and the front edge of the housing.

14. An electrical connector as recited in claim 9, wherein, the wiping surfaces cover front tips of the contacts.

15. An electrical connector as recited in claim 9, wherein, the wiping surfaces are ramps.

16. An electrical connector comprising: an insulative housing, conductive contacts within an interior of the housing, wiping surfaces on a mating end of the housing, conductive surfaces on the contacts being offset laterally of the wiping surfaces and being rearward of the wiping surfaces to engage mating contacts of another, mating connector which mating contacts pass the wiping surfaces prior to engagement with the conductive surfaces, and a conductive shield surrounding the mating end of the housing, the wiping surfaces being closer to the shield than the contacts, and the conductive surfaces being raised with respect to edge margins of the contacts received in grooves in the housing.

17. An electrical connector as recited in claim 9 wherein, the conductive surfaces on each contact are between edge margins on each contact, and the wiping surfaces are offset from the conductive surface areas on the contacts, and are in alignment with the edge margins on the contacts.

18. An electrical connector as recited in claim 1 wherein, the conductive surfaces on each contact are between edge margins on each contact, and the wiping surfaces are offset from the conductive surfaces on the contacts, and are in alignment with the edge margins on the contacts.

*19. Mateable electrical connectors comprising:*

*a first and a second electrical connector having mateable signal contacts and at least one first power contact mateable with at least one second power contact;*

*the first power contact having opposed contact fingers extending from a first body portion and the second power contact having opposed contact surfaces;*

*the first electrical connector having a shrouded housing portion surrounding the at least one power contact;*

*the second electrical connector having a housing complementary with said first electrical connector, thereby receiving the shrouded housing portion and the at least one power contact therein;*

*wherein the opposed contact fingers of the first power contact are received between the opposed contact surfaces of the second power contact such that the contact fingers resiliently deflect inwardly and exert pressure on the opposed contact surfaces.*

*20. The mateable electrical connectors of claim 19, wherein the first power contact and the second power contact have a surface area sufficiently broad to radiate heat resulting from electrical power dissipation.*

*21. The mateable electrical connectors of claim 20, wherein the first power contact and the second power contact have a greater mass than the signal contacts in order to carry greater electrical current and thereby limit the temperature of the first power contact and the second power contact.*

*22. The mateable electrical connectors of claim 19, wherein the first power contact and the second power contact have lances which retain them in the first electrical connector and second electrical connector, respectively.*

*23. An electrical connector assembly, comprising:*

*a first electrical connector comprised of an insulative housing having a front mating face with both signal contacts and power contacts positioned within the housing, the signal contacts being positioned within the housing with mating contact portions adjacent said front mating face, and said power contacts being profiled as male contacts having a contact section comprised of opposed contact arms interconnected along a side edge thereof with at least one portion extending forwardly from each of said contact arms to define contact fingers positioned adjacent said front mating face;*

*a second electrical connector profiled for mating with said first electrical connector, said second electrical connector including a housing complementary with said first electrical connector, and including signal and power contacts which are complementary with respective signal and power contacts of said first electrical connector, said power contacts of said second electrical connector being profiled as female contacts having contact portions profiled for overlapping engagement with said contact fingers of said first connector; and*

*wherein said first and second connectors each comprise a like plurality of rows and columns of contact receiving cavities having signal contacts positioned therein, said power contacts of said first and second connectors have greater mass than said signal contacts of said first and second connectors, and said power contacts of said first and second connectors are positioned in power contact receiving cavities which occupy the transverse envelope of a plurality of rows of signal contacts.*

*24. The electrical connector assembly of claim 23, wherein said signal and power contacts of said first and second connector further include termination sections for termination to further conductors.*

*25. The electrical connector assembly of claim 24, wherein said termination sections for said signal and power contacts of said first connector are profiled as printed circuit board contact sections.*

*26. The electrical connector of claim 25, wherein each power contact has a plurality of printed circuit board contact sections.*

*27. The electrical connector assembly of claim 24 wherein said termination sections for said signal and power contacts of said first connector are profiled as wire termination sections.*

*28. The electrical connector assembly of claim 23, wherein said opposed contact arms of the power contacts of said first electrical connector are formed as planar sections, substantially parallel to each other.*

*29. The electrical connector assembly of claim 23, wherein said female contacts of said second electrical connector are formed as planar sections, substantially parallel to each other.*

*30. The electrical connector assembly of claim 23, wherein said opposed contact arms of the power contacts of said first electrical connector are formed as planar sections, substantially parallel to each other.*

*31. The electrical connector assembly of claim 30, wherein said female contacts of said second electrical connector are formed as planar sections, substantially parallel to each other.*

*32. The electrical connector assembly of claim 31, wherein said planar sections of said male power contacts and said female power contacts are connected along only a portion of their length.*

*33. The electrical connector assembly of claim 23, wherein said power contact fingers of said first electrical connector are resiliently deformable inwardly during mating with the power contacts of said second electrical connector.*

*34. The electrical connector of claim 23, wherein said signal contacts and said power contacts of both said first and second connectors are recessed within said respective housings.*

*35. The electrical connector of claim 34, wherein said first and second electrical connectors further include shield members which substantially enclose said respective housings.*

* * * * *